Oct. 22, 1929.  M. I. BRADLEY  1,733,050
CONTROL MECHANISM
Filed Dec. 10, 1927
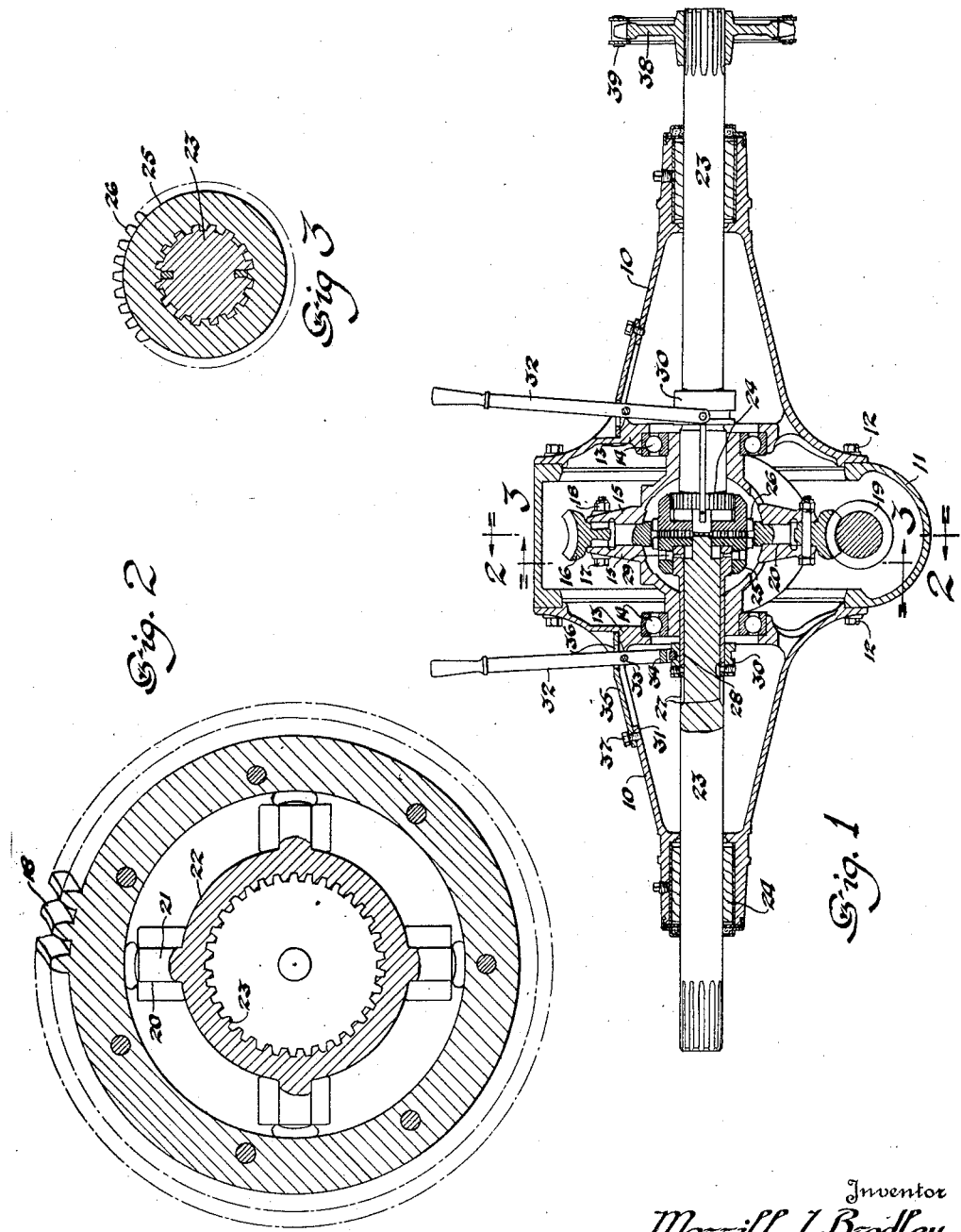
Inventor
Merrill J. Bradley
By [signature]
Attorney Patented Oct. 22, 1929

1,733,050

UNITED STATES PATENT OFFICE

MERRILL I. BRADLEY, OF DETROIT, MICHIGAN, ASSIGNOR TO UNIVERSAL POWER SHOVEL COMPANY, A CORPORATION OF MICHIGAN

CONTROL MECHANISM

Application filed December 10, 1927. Serial No. 239,031.

This invention relates to control mechanism such as may be employed in the driving of caterpillar tracks and the like or for other mechanisms, the principal object being the provision of a new and novel construction simple in design, economical to manufacture and simple in operation.

Another object is to provide a housing with a hollow casing member rotatably supported therein, a pair of aligned axle shafts being rotatably received in and extending into the hollow interior of the casing, teeth being provided on the interior of the casing, and a slidable relatvely non-rotatable member being provided on each of the axle shafts within the casing, each of the slidable members being provided with means for engaging the teeth on the casing upon proper sliding movement thereof and being controlled in slidable position by manually operable means exterior to the housing.

The above being among the objects of the present invention the same consists in certain features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a partially broken vertical sectional view taken longitudinally through the center of a control mechanism constructed in accordance with the present invention.

Fig. 2 is a sectional view of the casing and co-operating parts taken on the line 2—2 of Fig. 1.

Fig. 3 is a sectional view of one of the axle shafts and the co-operating sliding member taken on the line 3—3 of Fig. 1.

In the accompanying drawing I show a housing comprising the end portions 10 and central portion 11 secured together by bolts such as 12 or other suitable means to form a unitary rigid structure. Each portion 10 has formed on the interior thereof a seat 13 in which is received the bearings 14. The bearings 14 rotatably support a hollow housing or casing comprising the two halves 15. A worm-wheel 16 is clamped between the halves 15 by the bolts 17 and nuts 18 which also serve to secure the halves 15 together. A worm 19 is supported in a conventional manner in the central portion 11 of the housing in mesh with the worm wheel 16. The halves 15 are each provided with four semi-cylindrical radially extending grooves in their matching faces which co-act with each other to form four radially extending openings 20 on the line of split of the halves 15. Within each of the openings 20 is received one of the four arms 21 of the ring member 22 the interior surface of which is provided with gear teeth 23 which are exposed on the inside of the casing. A pair of axle shafts 23 rotatably supported in the bearings 24 in the outer ends of the housing portion 10 extend through the casing members 15 in which they are rotatably supported and extend into substantially abutting relationship on the line of split of the casing members 15. The inner ends of the shafts 23 are splined as at 24 and a ring or sliding member 25 is fitted upon each of the splined ends 24 and is slidable axially of the shafts 23 thereon. Each of the ring members 25 have formed on their peripheries teeth 26 which are adapted to fit into and engage the teeth 23 on the ring member 22 when the corresponding ring member 25 is moved inwardly on the shaft 23 a sufficient amount. Each shaft 23 is provided, adjacent its inner end, with a pair of diametrically opposed axially parallel grooves 27 in the surface thereof, and in each groove 27 is slidably received a slidable key or member 28 the inner end of which is secured by rivets such as 29 to the corresponding ring member 25. The keys 28 project from the inner side of the casing halves to the exterior thereof and have secured to their outer ends a grooved collar member 30. Each of the housing portions 10 is provided with an opening 31 through which projects a lever member 32 pivoted on the housing at 33 and provided with a yoked lower end 34 which engages the groove of the corresponding collar 30. A cover member 35 having a suitable opening 36 for the passage of the lever member 32 is secured to the housing portion 10 by screws such as 37 and serves to close the opening 31 against the entrance of dust and dirt.

In practice when power is applied to the worm 19 to cause rotation of the same, the worm wheel 16, casing halves 15 and ring 22 are caused to rotate in the housing in accordance therewith. When the upper ends of the lever members 32 are moved outwardly as indicated in Fig. 1, and their yoke ends 34 acting through the collars 30 and keys 28 have moved both ring members 25 inwardly so that the teeth 26 thereof are in engagement with the teeth 23 formed on the inner face of the ring member 22, it will be apparent that both shafts 23 will be locked to rotate with the casing and worm wheel 16. Should the upper end of either of the levers 32 now be moved inwardly, its corresponding yoke end 34 acting through the corresponding collar 30 and keys 28 will draw the corresponding ring member 25 out of engagement with the ring member 22 and thereafter the corresponding shaft 23 will not rotate with the casing, and the other shaft 23 only will continue to rotate therewith. By suitable movement of the upper ends of the levers 32 both of the shafts 23 may be caused to rotate with the casing, either one of the shafts 23 may be caused to rotate with the casing or the casing may rotate independently of movement of both of the shafts 23.

The construction shown may be adapted to a variety of different uses. For instance, sprockets such as 38 may be provided on the outer splined ends of the shafts 23, and the sprockets 38 may be connected by chains such as 39 to the driving sprocket of a caterpillar track mechanism in order to drive the same in such a manner that the mechanism carried by the caterpillar tracks may be directed or steered in its movements by movement of either one or both of the tracks through the proper movement of the levers 32; or road wheels may be mounted directly on the outer ends of the shafts 23; or it may be found desirable to mount drums of different types on the outer ends of the shafts 23, and I do not limit the mechanism to any specific use.

Formal changes may be made in the specific embodiment of the invention described without departing from the spirit or substance of the broad invention, the scope of which is commensurate with the appended claims.

What I claim is:

1. In combination, a housing, a hollow casing rotatably supported therein, a toothed member secured to rotate with said casing and having its teeth exposed on the interior of said casing, a pair of aligned shafts rotatably supported at one end by said housing and rotatably supported at their other ends in said casing, a slidable relatively non-rotatable member carried by each of said shafts within said casing provided with teeth engageable with the teeth of said toothed member, and separate means for sliding each of said slidable members into or out of engagement with said toothed member.

2. In combination, a housing, a hollow casing rotatably received in said housing, a toothed member secured against relative rotation to said casing with its teeth exposed on the interior thereof, a pair of separate aligned axle shafts rotatably received in said casing, a slidable member splined to each of said axle shafts within said casing, teeth on each of said slidable members engageable with said toothed member for locking said slidable members to said casing for equal rotation therewith, and separate means exterior to said housing for controlling the slidable position of each of said slidable members.

3. In combination, a housing, a hollow casing rotatably received in said housing, a toothed member secured against relative rotation to said casing with its teeth exposed on the interior thereof, a pair of separate aligned axle shafts rotatably received in said casing, a slidable member splined to each of said axle shafts within said casing, teeth on each of said slidable members engageable with said toothed member for locking said slidable members to said casing for equal rotation therewith, an element secured against axial movement relative to each of said slidable members extending outwardly therefrom between the corresponding axle shaft and said casing, and a lever operatively connected to each of said slidable elements for controlling the position thereof axially of said shafts.

4. In combination, a housing, a casing rotatably mounted therein, teeth fixed relative to said casing exposed on the interior thereof, a pair of aligned axle shafts rotatably received in said casing, a groove in the surface of said shafts parallel to the axis thereof, a member slidably received in each of said grooves extending both inwardly and outward of said casing, a toothed member secured to each of the first mentioned members within said casing, a collar secured to each of said first mentioned members exteriorly of said casing, and a lever engaging each of said collars pivotally carried by said housing whereby said toothed members may be moved axially of said shafts to cause the teeth thereof to engage or disengage the first mentioned teeth.

5. In combination, a housing, a hollow casing rotatably received in said housing, means for rotating said casing, said casing comprising two halves secured together in a plane perpendicular to the axis of rotation thereof, said casing halves having a plurality of matching depressions in their adjacent faces, an internally toothed member within said casing, outwardly projecting portions on said toothed member received in said matching depressions, a pair of aligned rotatable shafts extending into said casing, an axially slidable relatively non-rotatable member carried by each of said shafts, said members being formed to permit locking engagement thereof with said toothed member, and independent means for controlling the slidable position of each of said members on said shaft whereby to independently control said locking engagement of said members with said toothed member.

6. In combination, a housing, a casing rotatably received therein, said casing comprising a pair of halves having cooperating faces disposed in a plane perpendicular to the axis of rotation thereof and operatively secured relative to each other, a gear member having an inwardly extending flange clamped between said halves, an internally toothed member positioned within said casing, radially extending pins on said toothed member received between said halves for non-rotatably supporting said toothed member relative to said casing, a pair of aligned shafts extending into said casing and rotatably received thereby, an axially shiftable relatively non-rotatable clutch member carried by each of said shafts and each formed for engagement with said toothed member, and means for controlling the axially slidable positions of said clutch members.

MERRILL I. BRADLEY.